US00RE38954E

(19) United States
(12) Reissued Patent
Yamada et al.

(10) Patent Number: US RE38,954 E
(45) Date of Reissued Patent: Jan. 31, 2006

(54) TELEVISION SIGNAL PROCESSOR THAT IS OPERABLE TO GENERATE A TELEVISION SIGNAL BROADCAST WAVES WITH A PLURALITY OF DIFFERENT BROADCAST STANDARDS

(75) Inventors: Mikihiko Yamada, Ibaraki (JP); Hirotoshi Uehara, Kyotanabe (JP)

(73) Assignee: Matsushita Electric Industrial Co., Ltd., Osaka (JP)

(21) Appl. No.: 10/659,683

(22) PCT Filed: Sep. 25, 1998

(86) PCT No.: PCT/JP98/04308

§ 371 (c)(1),
(2), (4) Date: May 25, 1999

(87) PCT Pub. No.: WO99/17544

PCT Pub. Date: Apr. 8, 1999

Related U.S. Patent Documents

Reissue of:
(64) Patent No.: 6,288,750
Issued: Sep. 11, 2001
Appl. No.: 09/308,776
Filed: May 25, 1999

(30) Foreign Application Priority Data

Sep. 26, 1997 (JP) ..... 261678/1997

(51) Int. Cl.
*H04N 5/445* (2006.01)
*H04N 9/74* (2006.01)

(52) U.S. Cl. ..... 348/553; 348/563; 348/569; 348/598; 348/600

(58) Field of Classification Search ..... 348/553, 348/563, 569, 584, 589, 598, 600, 558, 554, 348/555; H04N 5/445, 9/74, 5/46
See application file for complete search history.

(56) References Cited

U.S. PATENT DOCUMENTS

| | | | | | |
|---|---|---|---|---|---|
| 4,962,427 | A | * | 10/1990 | Lunn et al. | 348/555 |
| 5,359,367 | A | | 10/1994 | Stockill | |
| 5,534,942 | A | | 7/1996 | Beyers, Jr. et al. | |
| 5,796,442 | A | * | 8/1998 | Gove et al. | 348/556 |
| 5,822,425 | A | | 10/1998 | Ezaki et al. | |
| 6,175,388 | B1 | * | 1/2001 | Knox | |
| 6,549,243 | B1 | * | 4/2003 | Takashimizu et al. | 348/558 |

FOREIGN PATENT DOCUMENTS

| | | | | |
|---|---|---|---|---|
| EP | 0 393 352 | | | 10/1990 |
| EP | 0 729 276 | | | 8/1996 |
| JP | 08-154216 | | | 6/1996 |
| JP | 969992 | A | * | 3/1997 |
| JP | 983889 | A | * | 3/1997 |
| JP | 9-130766 | | | 5/1997 |
| JP | 9149331 | A | * | 6/1997 |
| JP | 9289498 | A | * | 11/1997 |
| WO | 96/00478 | | | 1/1996 |

* cited by examiner

*Primary Examiner*—Sherrie Hsia
(74) *Attorney, Agent, or Firm*—Wenderoth, Lind & Ponack, L.L.P.

(57) ABSTRACT

In an effective display area, an additional information recognizing part 203 recognizes a standard of a broadcast wave, refers to a ROM 212 and selects a target value, and provides an internal clock of a video data reading part 205 and an internal clock of an OSD data reading part 206 with the target value. At a retrace interval, on the other hand, the additional information recognizing part 203 notifies an additional information synthetic position deciding part 210 of the standard of the broadcast wave. The additional information synthetic position deciding part 210 selects from a ROM 211 a target value for reading the additional information applicable to the notified standard, and outputs the target value to an additional information reading parts 207. When the standard of the broadcast wave is changed, target values corresponding to the changes are responsively selected from the ROM 212 and the ROM 211.

17 Claims, 8 Drawing Sheets

TELEVISION SIGNAL PROCESSOR THAT IS OPERABLE TO GENERATE A TELEVISION SIGNAL BROADCAST WAVES WITH A PLURALITY OF DIFFERENT BROADCAST STANDARDS

Matter enclosed in heavy brackets [ ] appears in the original patent but forms no part of this reissue specification; matter printed in italics indicates the additions made by reissue.

*This application is a reissue application of U.S. Pat. No. 6,288,750, issued Sep. 11, 2001. An additional reissure application Ser. No. 11/218,276, filed on Sep. 2, 2005, of U.S. Pat. No. 6,288,750, issued Sep. 11, 2001, has been filed, which is a divisional of the reissure application Ser. No. 10/659,683, filed Sep. 11, 2003.*

TECHNICAL FIELD

The present invention relates to television signal processors, and more specifically to a television signal processor processing a received broadcast wave and generating a television signal.

BACKGROUND ART

In recent years, due to digitalization of television broadcasting, various needs or services which have been beyond imagination in general broadcasting are beginning to emerge. As to a channel which only broadcasts movie programs, for example, a technology of copy guard is important to protect a copyright so as not to allow an unlimited copy on the receiver. Recently, therefore, it was proposed to multiplex information such as copy guard into a digital broadcast wave as additional information and to carry the copy guard in the wave so as to allow the receiver to utilize the same. Such additional information is classified according to a standard such as CGMS (IEC1880) and WSS (ETS300, 294). As to methods how to utilize the additional information, various methods are now under consideration.

The digital broadcast wave is inputted to the receiver in the form of a bit stream. Therefore, when the receiver is going to utilize the aforementioned additional information, the receiver first recognizes the additional information multiplexed into the digital broadcast wave, and separates the same. Thereafter the receiver generates an analog video signal from the digital broadcast wave, and then inserts the separated additional information into a retrace interval of the analog video signal to output. By performing such processing, it becomes possible to utilize the additional information in various types of peripheral equipment (for example, a video tape recorder) on the receiver. The aforementioned series of signal processing can be executed by a television signal processor illustrated below.

FIG. 8 shows a block diagram which is an exemplary conventional television signal processor 100. The television signal processor shown in FIG. 8 is formed by a decoding part 101, a CPU interface (hereinafter, referred to as CPUI/F) 103, a RAM interface (hereinafter, referred to as RAMI/F) 105, video data reading part 106, OSD data reading part 107, a horizontal/vertical synchronous pulse generating part 108, a video data line buffer 109, an OSD data line buffer 110, combining part A 111, a CGMS timing generating part 112, a CGMS data buffer 113 and a combining part B 114.

The decoding part 101 generates video data by processing an inputted video stream, and then outputs the same to a work RAM 102 through the RAMI/F 105. The work RAM 102 stores the video data. Referring to FIG. 8, a CPU 104 shown outside the conventional television signal processor generates OSD data. Herein, OSD (On Screen Display) stands for a channel, a receiving mode, a volume, characters of text broadcasting and the like displayed on a currently operating television screen. The OSD is generated on the basis of the OSD data generated by the CPU 104. The OSD data generated by the CPU 104 is inputted to the work RAM 102 through the CPUI/F 103 and the RAMI/F 105. The work RAM 102 stores the inputted OSD data.

The video data reading part 106 reads the video data stored in the work RAM 102 at prescribed timing. The read timing at this time is defined on the basis of a read timing signal for the work RAM 102 inputted from the CPU 104 through the CPUI/F 103 and the RAMI/F 105, and a vertical pulse and a horizontal pulse generated by the horizontal/vertical synchronous pulse generating part 108. The video data read from the work RAM 102 is temporarily stored in the video data line buffer 109. The OSD data reading part 107 reads the OSD data from the work RAM 102 in a manner similar to the above. The read OSD data is temporarily stored in the OSD data line buffer 110.

The combining part A 111 combines the video data inputted from the video data line buffer 109 and the OSD data inputted from the OSD data line buffer 110. Additional information (here assumed to be CGMS) separated from the broadcast wave inputted from the CPU 104 through the CPUI/F 103 is temporarily stored in the CGMS data buffer 113. The CGMS timing generating part 112 generates a synthetic timing signal on the basis of the horizontal synchronous pulse and the vertical synchronous pulse generated by the horizontal/vertical synchronous pulse generating part 108. In the combining part 114, the CGMS data is synchronized with the synthetic timing signal generated by the CGMS timing generating part 112, and is combined with the video data with which the OSD data was combined.

As described above, for the conventional television signal processor, the second combining part 114 further combining the additional information such as copy guard (here CGMS) into the video data with which the OSD data has been combined was required in addition to the first combining part 111 combining the OSD data to the video data. This results in a complicated structure and a higher cost.

Further, the conventional television signal processor has been aimed at receiving only a digital broadcast wave of a predetermined standard. Therefore, the synthetic timing for the video data, the OSD data and the additional information is fixedly set. Consequently, if the standard of the received digital broadcast wave is different from the previously planned standard, the conventional television signal processor cannot recognize such change, and accordingly cannot combine the video data, the OSD data and the additional information at proper timing.

Therefore, an object of the present invention is to provide a television signal processor which can, even if the standard of a received broadcast wave changes, flexibly cope with such change with a simpler structure and a lower cost.

SUMMARY OF THE INVENTION

The present invention has, in order to attain the aforementioned object, the following features.

A first aspect of the present invention is directed to a television signal processor processing a received broadcast wave and generating a television signal. The processor comprises:

a storage part for storing video data and additional information separated from the received broadcast wave and OSD data generated on a receiver;

a reading part for respectively reading the video data, the additional information and the OSD data from the storage part;

a standard detecting part for detecting a standard of the received broadcast wave;

a timing controlling part for respectively controlling the timing of the reading part for reading the video data, the OSD data and the additional information from the storage part in correspondence to the standard detected by the standard detecting part; and a combining part for combining the video data, the OSD data and the additional information read by the reading part to output the combined data as a television signal.

As described above, in the first aspect, the standard of the received broadcast wave is detected so as to respectively control timing for reading the video data, the OSD data and the additional information from the storage part in correspondence thereto, whereby, even if the standard of the received broadcast wave changes, the video data, the OSD data and the additional information can be combined regularly at proper timing in correspondence to such change.

Conventionally, two steps of synthetic processing are included, first combining video data and OSD data in an effective display area and thereafter combining additional information in the retrace interval. In the first aspect, on the other hand, the video data, the OSD data, and the additional information are respectively read from a single storage part at prescribed timing and then combined without differentiating between the effective display area and the retrace area, whereby synthetic processing of the video data, the OSD data, and the additional information in a single combining part can be achieved.

A second aspect of the present invention, which is an aspect dependent on the first aspect, is characterized in that the broadcast wave is a digital broadcast wave.

A third aspect of the present invention, which is an aspect dependent on the first aspect, is characterized in that the timing control part includes:

a memory part for storing timing information for defining the read timing of the reading part according to standard of the broadcast wave; and a reference part for referring to the memory part for timing information corresponding to the standard detected by the standard detecting part, and supply the same to the reading part, the reading part respectively reads the video data, the additional information, and the OSD data from the storage part at timing corresponding to the timing information supplied form the reference part.

As described above, according to the third aspect, read timing for the video data, OSD data, and additional information is supplied on the basis of the standard of the broadcast wave which was previously stored. Even if the read timing is changed due to a change of the standard of the broadcast wave, each reading part can read the video data, the OSD data, and the additional information at timing corresponding to the standard detected by the standard detecting part.

A fourth aspect of the present invention, which is an aspect dependent on the third aspect, is characterized in that the memory part includes:

a first table memory stored timing information for defining read timing for video data and OSD data according to standard of the broadcast wave; and a second table memory stored timing information for defining read timing for additional information according to standard of broadcast wave and information in the additional information, the reference part refers to the first table memory thereby providing the reading part with the timing information for defining the read timing for the video data and the OSD data, and refers to the second table memory thereby providing the reading part with the timing information for defining the read timing for the additional information.

As described above, according to the fourth aspect, the read timing for the additional information can be controlled in correspondence to not only a change of the standard of the broadcast wave but a change of information in the additional information.

A fifth aspect of the present invention, which is an aspect dependent on the first aspect, is characterized in that the television signal processor further comprises a level converting part for converting an output level of the additional information read by the reading part, and the combining part combines the additional information whose output level is converted by the level converting part into the video data and the OSD data read by the reading part.

As described above, according to the fifth aspect, the output level of the read additional information can be converted into a preferable prescribed output level.

A sixth aspect of the present invention, which is an aspect dependent on the fifth aspect, is characterized in that the level converting part converts the output level of the additional information into a level determined according to the standard detected by the standard detecting part.

As described above, according to the sixth aspect, the output level of the read additional information can be converted into a prescribed output level subjecting to the standard of the broadcast wave.

DETAILED DESCRIPTION OF THE INVENTION

Figure 1:
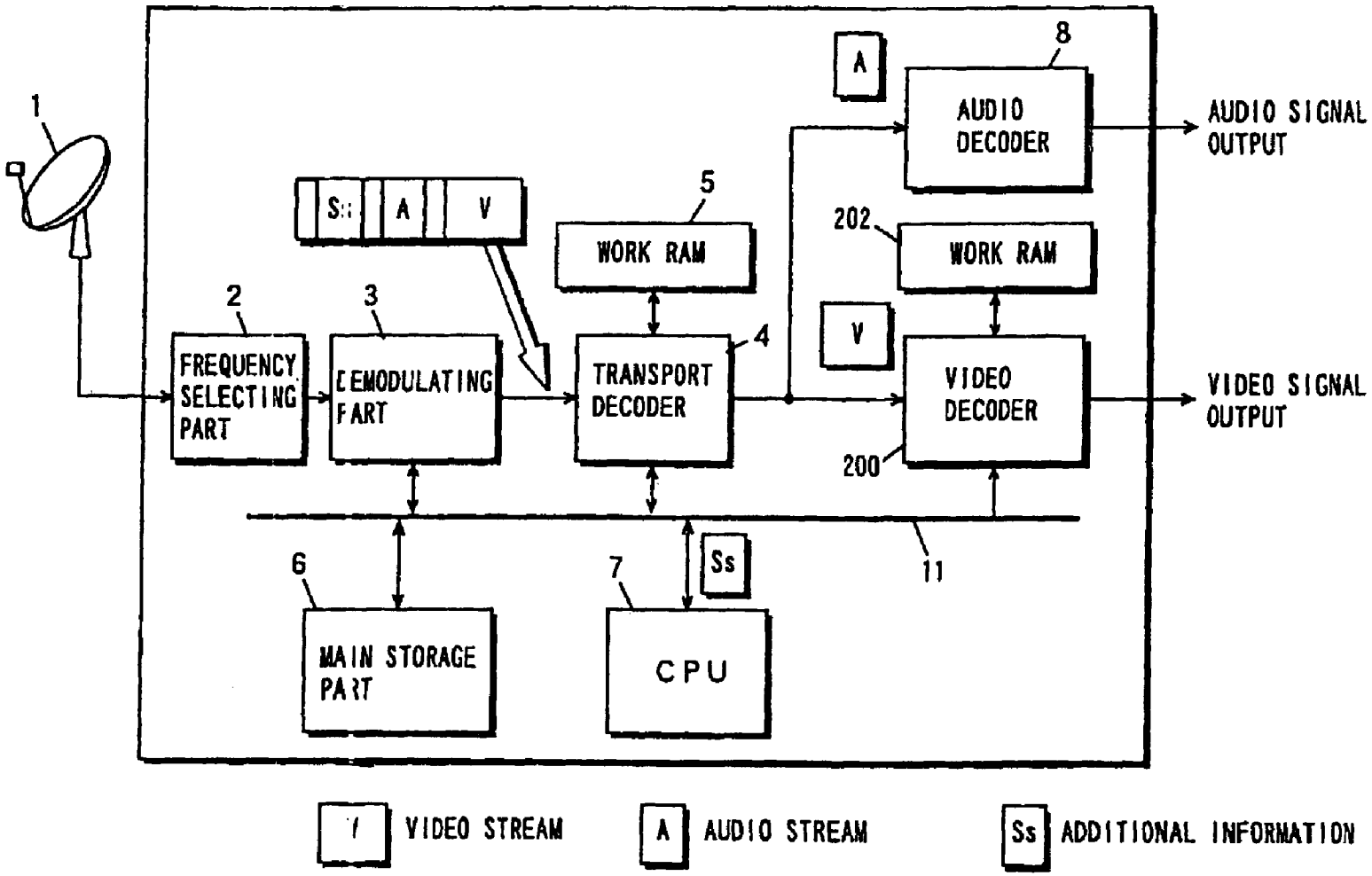
FIG. 1 shows a block diagram which is the structure of a set top box comprising a television signal processor according to an embodiment of the present invention as a video decoder.

FIG. 1 shows a block diagram which is an example of a set top box comprising a television signal processor according to an embodiment of the present invention. Referring to FIG. 1, an antenna 1 receives digital broadcast waves. A frequency selection part 2 selects any broadcast wave of a specific frequency from the broadcast waves received in the antenna 1, and outputs the same to a demodulating part 3. The demodulating part 3 demodulates the broadcast wave selected by the frequency selection part 2, and outputs the same to a transport decoder 4. In the signal demodulated by the demodulating part 3, a video stream, an audio stream, additional information, and other types information are multiplexed in a time-divisional manner. The signal outputted by the demodulating part 3 is called a transport stream. In the transport stream, the transport decoder 4 respectively separates the video stream, the audio stream, the additional information and other types of information which are multiplexed in a time-division manner. Thereafter the video stream is outputted to a video decoder 200 (a television signal processor 200 corresponding to a fist embodiment of the present invention), the audio stream is outputted to an audio decoder 8 and the additional information Ss is outputted to a CPU 7 respectively. Copy generation control and copy guard are performed on the basis of the additional information (CGMS, WSS or the like). Further, the CPU 7 generates OSD (On Screen Display) data So, and outputs this OSD data So and the above additional information Ss to a video decoder through a data bus 11. Here, OSD (On Screen Display) stands for a channel, a receiving mode, a volume, characters of text broadcasting and the like displayed on a currently operating television screen. The OSD is generated on the basis of the OSD data So generated by the CPU 7. Elements 5 and 6 represent a work RAM and a main storage part, respectively. A work RAM 202 is described later along with the television signal processor 200.

Figure 2:
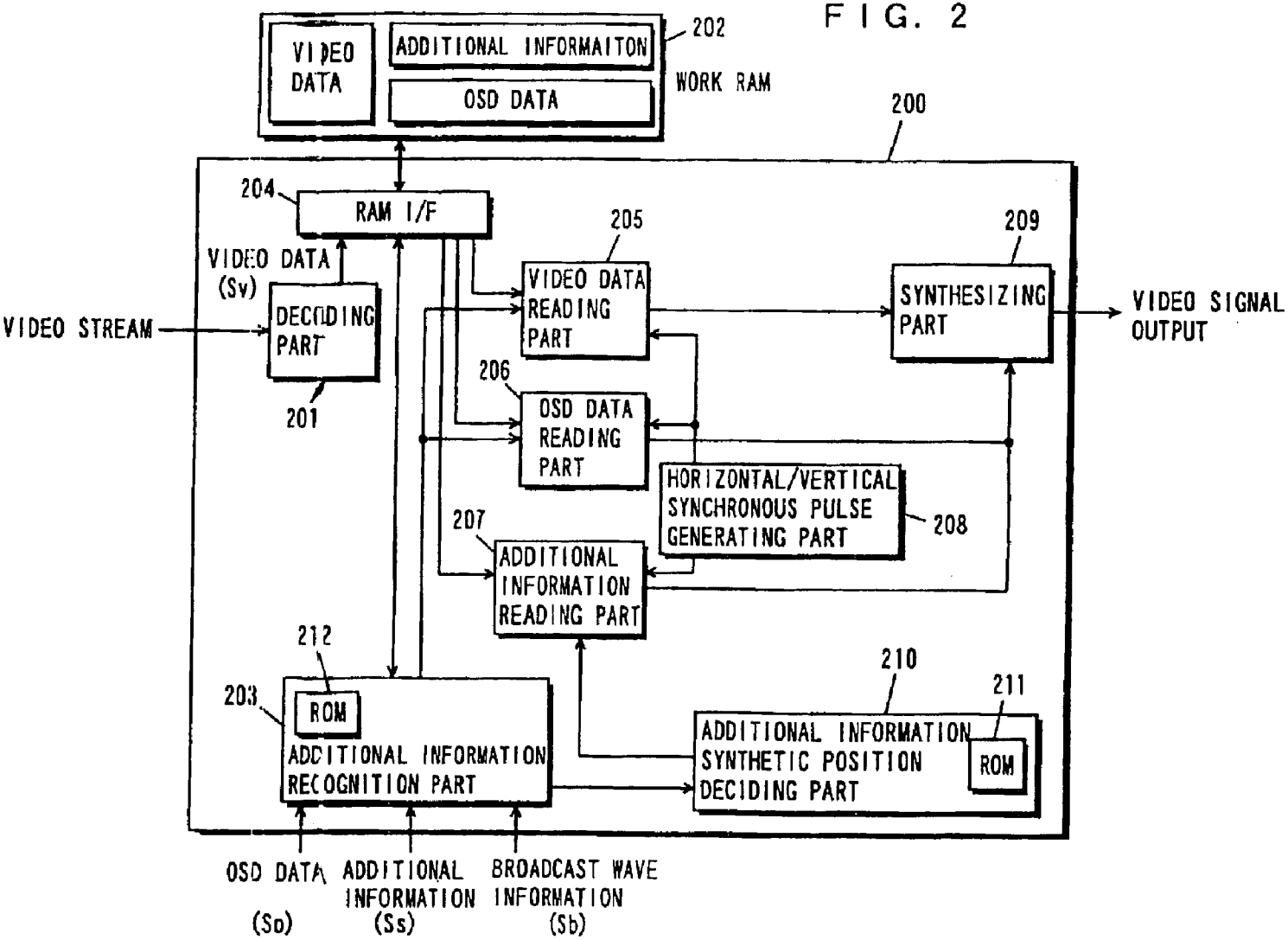
FIG. 2 shows a block diagram which is the structure of a television signal processor according to a first embodiment of the present invention.

FIG. 2 shows a block diagram which is the structure of the television signal processor according to the first embodiment of the present invention, corresponding to the video decoder 200 in FIG. 1. Referring to FIG. 2, the television signal processor 200 of this embodiment comprises a decoding part 201, an additional information recognizing part 203, a ROM 212 in the additional information recognizing part 203, a RAM interface 204, a video data reading part 205, an OSD data reading part 206, an additional information reading part 207, a horizontal/vertical synchronous pulse generating part 208, a combining part 209, an additional information synthetic position deciding part 210, and a ROM 211 in the additional information synthetic position deciding part 210.

The transport decoder 4 outputs the video stream to the decoding part 201. The decoding part 201 decodes the inputted video stream and generates video data Sv. The decoding part 201 stores the generated video data Sv in the work RAM 202 through the RAM interface 204. The work RAM 202 accepts and stores the video data Sv. The additional information recognizing part 203 accepts the additional information Ss and the OSD data inputted from the data bus 11, and stores the additional information Ss and the OSD data So in the work RAM 202 through the RAM interface 204. Further, the additional information recognizing part 203 accepts broadcast wave information Sb included in the video stream outputted by the transport decoder 4.

When the user changes a channel of a broadcasting station, the multiplexed state of the video data Sv, the OSD information So, and the additional information Ss can be changed. Even if the channel is not changed, the broadcasting station may change the multiplexed state of the video data Sv and the additional information Ss. The broadcast wave information Sb is information for the user to recognize the standard of the broadcast wave of the broadcasting station which he/she currently watches and listens to, and a change of the multiplexed state of the additional information Ss to be multiplexed.

The video data reading part 205 is provided with a target value from the additional information recognizing part 203 with, and horizontal and vertical synchronous pulses from the horizontal/vertical synchronous pulse generating part 208. The video data reading part 205 includes a horizontal counter counting the horizontal synchronous pulse, a vertical counter counting the vertical synchronous pulse, and a comparator comparing the count values of these horizontal counter and vertical counter with the aforementioned target value. When the count values of the horizontal counter and the vertical counter coincide with the target value, the video data reading part 205 starts reading the video data Sv stored in the work RAM 202. The OSD data reading part 206 also includes a horizontal counter, a vertical counter, and a comparator similarly to the video data reading part 205, and starts reading the OSD data So stored in the work RAM 202 when count values of the horizontal counter and the vertical counter coincide with the target value. The additional information reading part 207 is provided with a target value from the additional information synthetic position deciding part 210, and horizontal and vertical synchronous pulses from the horizontal/vertical synchronous pulse generating part 208. The additional information reading part 207 also includes a horizontal counter, a vertical counter, and a comparator similarly to the video data reading part 205, and starts reading the additional information Ss stored in the work RAM 202 when count values of the horizontal counter and the vertical counter coincide with the target value.

Here, the target value outputted by the additional information recognizing part 203 is previously determined according to standardized broadcast wave, and stored in the ROM 212 as many as the standards thereof. When the additional information recognizing part 203 recognizes the broadcast wave, the additional information recognizing part 203 refers to the ROM 212 so as to select a target value of the standard corresponding to the broadcast wave. When the count values of the aforementioned horizontal counter and vertical counter coincide with the target value, the video data reading part 205 and the OSD data reading part 206 read the video data Sv and the OSD data So from the work RAM 202 through the RAM interface 204 at an effective display interval.

Next, a structure for combining the additional information Ss with the read video data Sv and OSD data So which are steadily read is described. The ROM 211 hierarchically stores information (a target value) for defining read timing for the additional information Ss to be combined at a retrace interval on the basis of a standard of a television signal notified by the additional information recognizing part 203. As the synthetic position of the additional information Ss at a retrace interval is varied due to the contents therein as well as the standard of the broadcast wave, a target value for reading the additional information Ss cannot be uniquely determined only through an operation performed by the additional information recognizing part 203 which recognizes the standard of the broadcast wave. Thus, the ROM 211 includes a first hierarchy corresponding to the standard of the broadcast wave, and a second hierarchy storing the target value corresponding to the content of the additional information Ss in the standard of this broadcast wave. The additional information synthetic position deciding part 210 refers to the ROM 211 and selects the target value. When the count values of the horizontal counter and the vertical counter coincide with the target value, the additional information reading part 207 reads the additional information Ss from the work RAM 202 through the RAM interface 204.

When the user changes a channel which he/she watches and listens to, a standard of the broadcast wave can be changed. Further, the broadcasting station may vary a standard of the broadcast wave with the time zone. When the standard of the broadcast wave changes, the target value of the video data Sv, the target value of the OSD data So, and the target value of the additional information Ss must be changed. The additional information recognizing part 203 can recognize a change of the standard of the broadcast wave since the broadcast wave information Sb is inputted thereto. In the ROM 212, further, a plurality of information corresponding to a plurality of standards of broadcast waves is stored as described above. When recognizing a change of the standard of the broadcast wave from the broadcast wave information Sb, the additional information recognizing part 203 refers to the ROM 212 and newly selects a target value after the change of the broadcast wave. The video data reading part 205 and the OSD data reading part 206 start reading the additional information Ss stored in the work RAM 202 when the count values of the horizontal counter and the vertical counter coincide with the target values. As for reading of the additional information Ss, the standard of the changed broadcast wave notified from the additional information recognizing part 203 is recognized, the ROM 211 is referred so as to select a new target value for reading the additional information Ss, and then the target value is outputted to the additional information reading part 207. When the count values of the horizontal counter and the vertical counter coincide with the target value, the additional information reading part 207 starts reading the additional information Ss stored in the work RAM 202. Thereafter the combining part 209 combines the OSD data So and the additional information Ss with the video data Sv on the synthetic position for the additional information corresponding to the changed standard. In this manner, the television signal processor of this embodiment can flexibly cope with a change of the multiplexed state of the additional information Ss occurred with a change of the channel or the broadcasting system.

An exemplary operation of the additional information recognizing part 203 is now described with reference to the block diagram shown in FIG. 2 showing the television signal processor 200 and a flowchart shown in FIG. 3.

Figure 3:
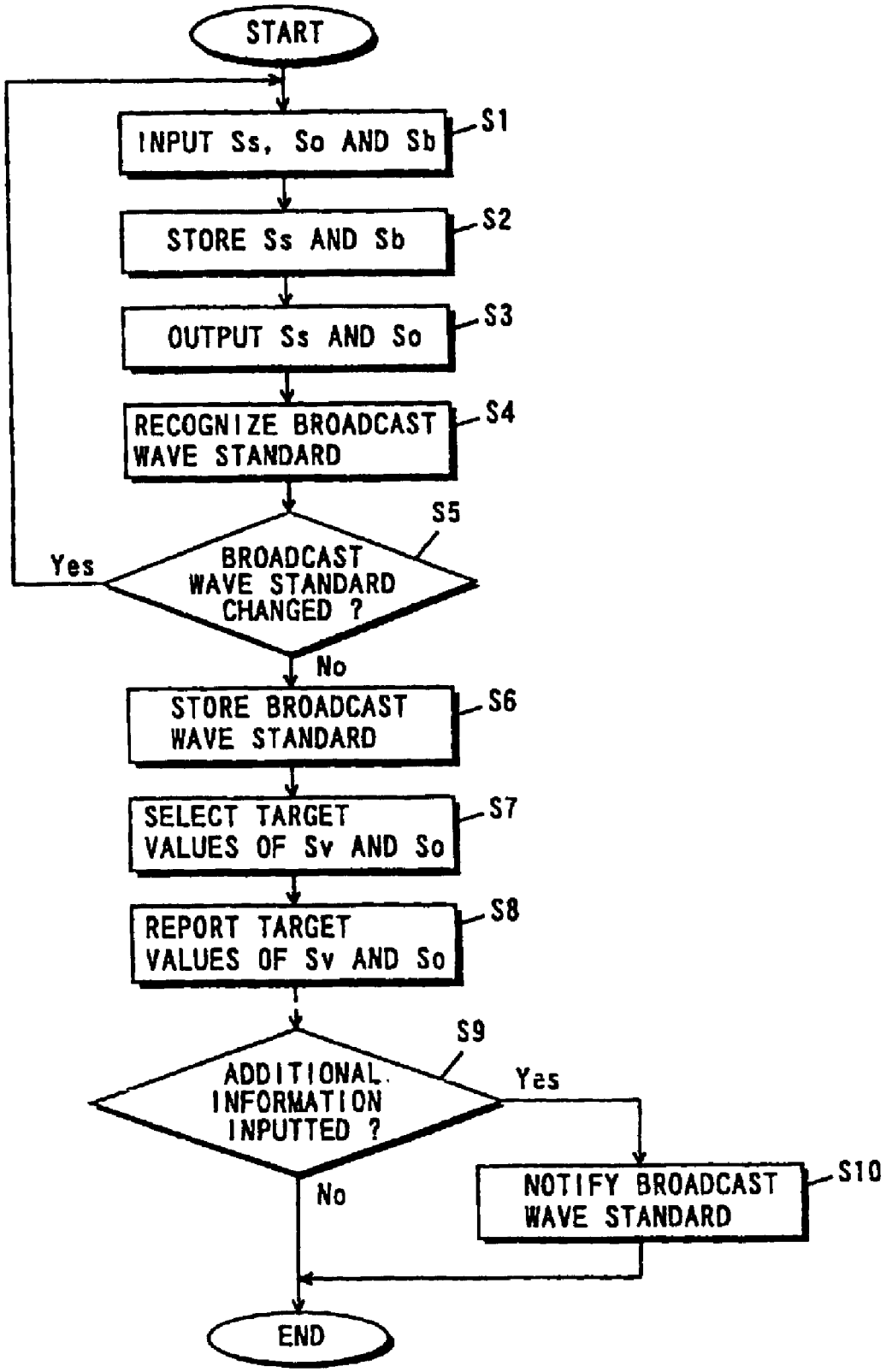
FIG. 3 is a flowchart showing an operation related to target value notice for reading video data Sv, OSD data So, and additional information Ss performed by an additional information recognizing part 203 of FIG. 2.

FIG. 3 is a flowchart showing an operation related to target value selection performed by the additional information recognizing part 203 for reading the video data Sv, the OSD data So, and the additional information Ss from work RAM 202 in FIG. 2, and a operation related to broadcast wave standard notice performed with respect to the additional information synthetic position deciding part 210 when the additional information is multiplexed into the broadcast wave.

First, the additional information Ss, the OSD data So, and the broadcast wave information Sb are inputted to the additional information recognizing part 203 (Step S1). The additional information recognizing part 203 stores the inputted additional information Ss and broadcast wave information Sb (Step S2). Then, the additional information recognizing part 203 outputs the additional information Ss and the OSD data So to the work RAM 202 through the RAMI/F 204 (Step S3). The additional information recognizing part 203 recognizes a standard of the broadcast wave on the basis of the broadcast wave information Sb (Step S4). The additional information recognizing part 203 can also recognize a change of the standard of the broadcast wave through the inputted broadcast wave information Sb. In Step S5, whether or not the broadcast wave standard has changed is determined. If the broadcast wave standard has changed, the operation returns to the step S1. If the broadcast wave standard has not changed, the additional information recognizing part 203 stores the broadcast wave standard of the currently selected broadcast wave (Step S6).

The additional information recognizing part 203 comprises therein the ROM 212. The ROM 212 stores a plurality of target values, which are reported by the additional information recognizing part 203 to the reading part so that the reading part reads data from the work RAM 202. When recognizing the standard of the broadcast wave, the additional information recognizing part 203 refers to the ROM 212 and selects the target value corresponding to the standard of the broadcast wave (Step S7). The selected target value is reported to the video data reading part 205 and the OSD data reading part 206 (Step S8). Then, whether or not the additional information Ss was inputted is determined (Step S9). When the additional information Ss is inputted, the additional information recognizing part 203 notifies the additional information synthetic position deciding part 211 of the standard of the broadcast wave (Step S10). If the additional information Ss is not inputted, the operation is terminated.

Figure 4:
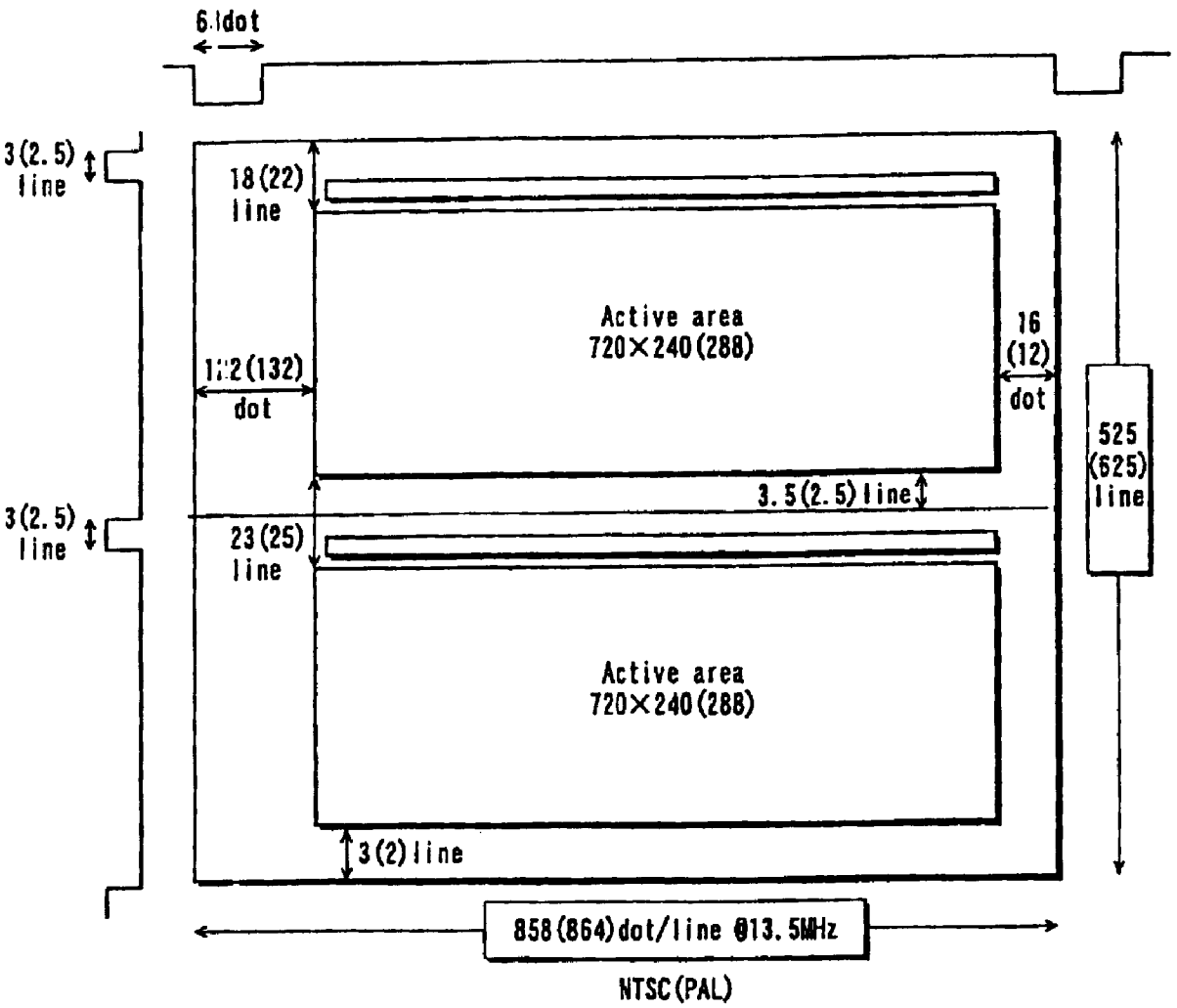
FIG. 4 shows synthetic position of additional information with respect to a vertical synchronous pulse in the case where the video standard is 480I.
Figure 5:
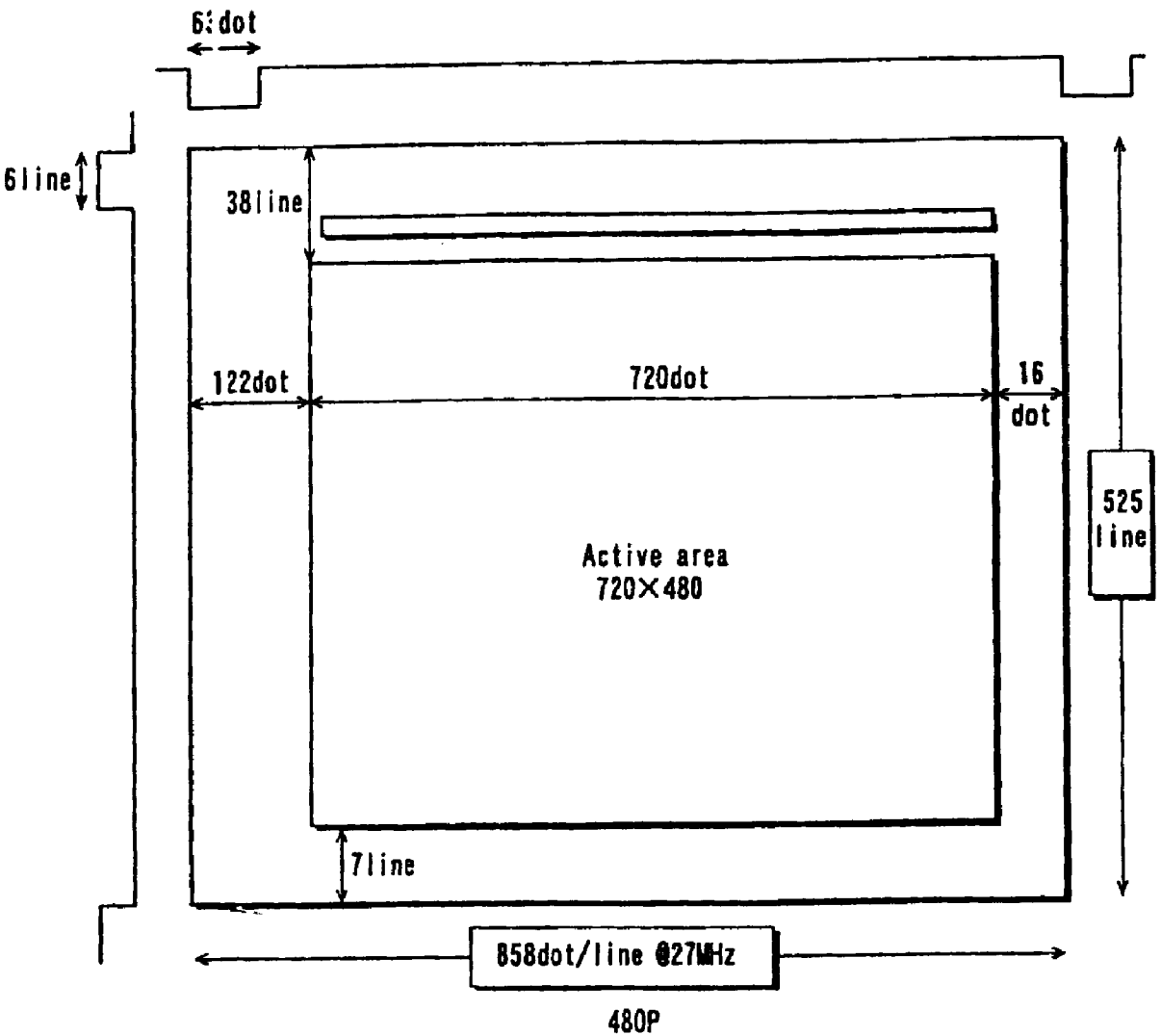
FIG. 5 shows a synthetic position of additional information with respect to a vertical synchronous pulse in the case where the video standard is 480P.
Figure 6:
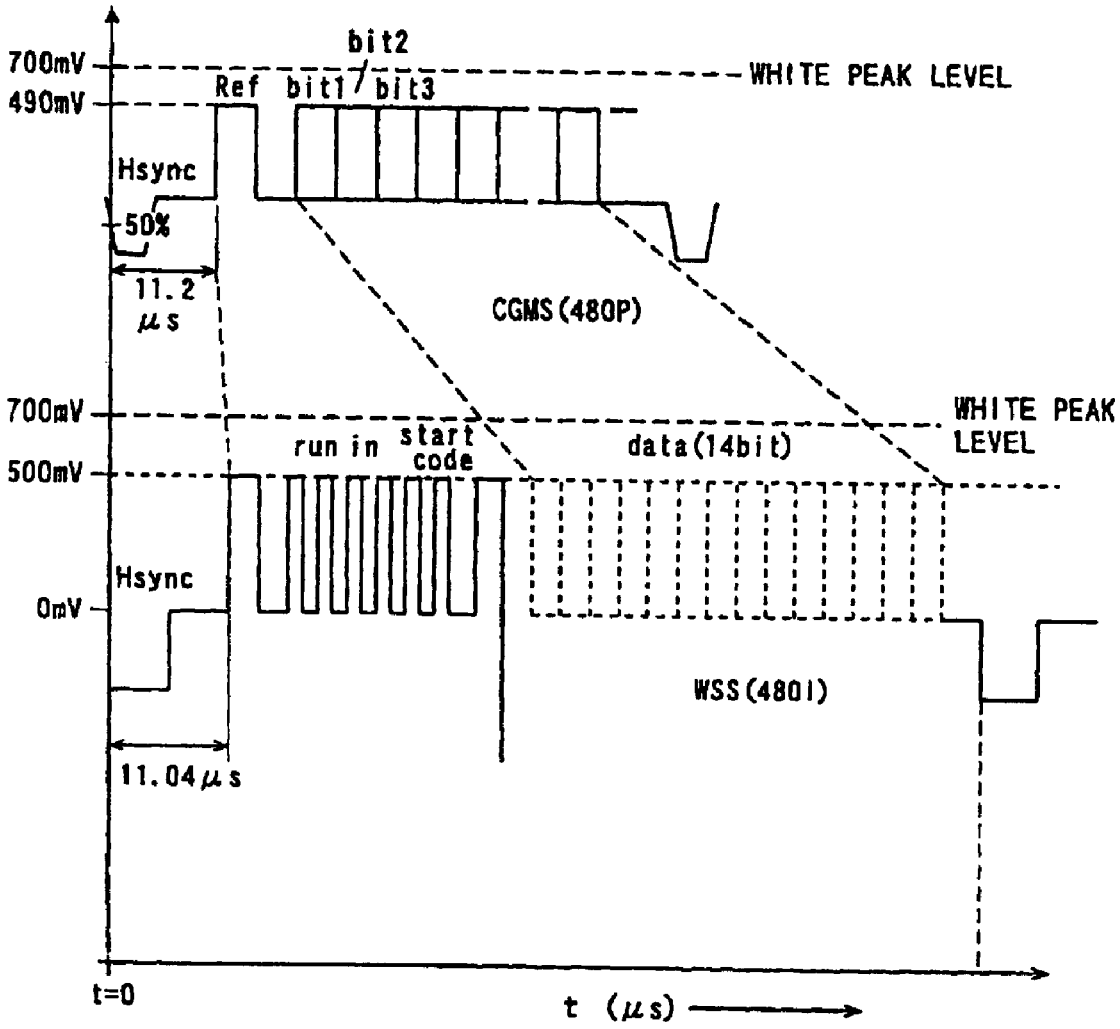
FIG. 6 shows a synthetic position of additional information CGMS and additional information WSS with respect to a horizontal synchronous pulse.

With reference to FIG. 4, FIG. 5 and FIG. 6, the timing of the television signal processor of this embodiment for starting the combination of the additional information at a retrace interval of video information is described. Here, two video standards for transmitting the additional information, i.e., 480I (hereinafter referred to as video standard 480I) and 480P whose horizontal frequency is twice that of the video standard 480I (hereinafter referred to as video standard 480P) are described.

FIG. 4 shows on which positions the additional information is combined with respect to the vertical synchronous pulse when the video standard is 480I. A waveform diagram shown on the left part of the exterior of the retrace interval shows a vertical synchronous pulse. Referring to FIG. 4, two lines in total drawn on upper portions of effective display areas respectively show the synthetic positions. The positions where the lines are drawn are the $17^{th}$ lines from the trailing edges of the vertical synchronous pulse respectively.

FIG. 5 shows on which position the additional information is combined with respect to the vertical synchronous pulse when the video standard is 480P. A waveform diagram shown on the left part of the exterior of the retrace interval shows the vertical synchronous pulse. A line drawn on an upper portion of an effective display area shows the synthetic position of the additional information. The position where the line is drawn is the $33^{rd}$ line from the trailing edge of the vertical synchronous pulse.

FIG. 6 shows on which positions additional information CGMS multiplexed into the video standard 480P and additional information WSS multiplexed into the video standard 480I are combined with respect to horizontal synchronous pulses respectively. Two waveform diagrams shown in FIG. 6 each have different scales with respect to a time axis t ($\mu$s), and hence broken lines in the figure indicate which point corresponds to which for convenience in writing. Referring to FIG. 6, a synthetic position for both of the additional information CGMS and the additional information WSS is based on t=0, where a trailing edge of the horizontal synchronous pulses is located. For the additional information CGMS, synthetic operation is started from t=11.2 (μs). For the additional information WSS, synthetic operation is started from t=11.0 (μs).

Further, FIG. 6 shows a peak voltage for each of the additional information CGMS and of the additional information WSS. These waveforms and peak voltages are set according to a standard. In the case of the video standard 480P and the video standard 480I, for example, the voltage of a white level at which white is displayed on a television screen is 700 mV. Further, the peak level of the additional information CGMS in the video standard 480P is 490 mV, and the peak level of the additional information WSS of the video standard 480I is set to be 500 mV.

Figure 7:
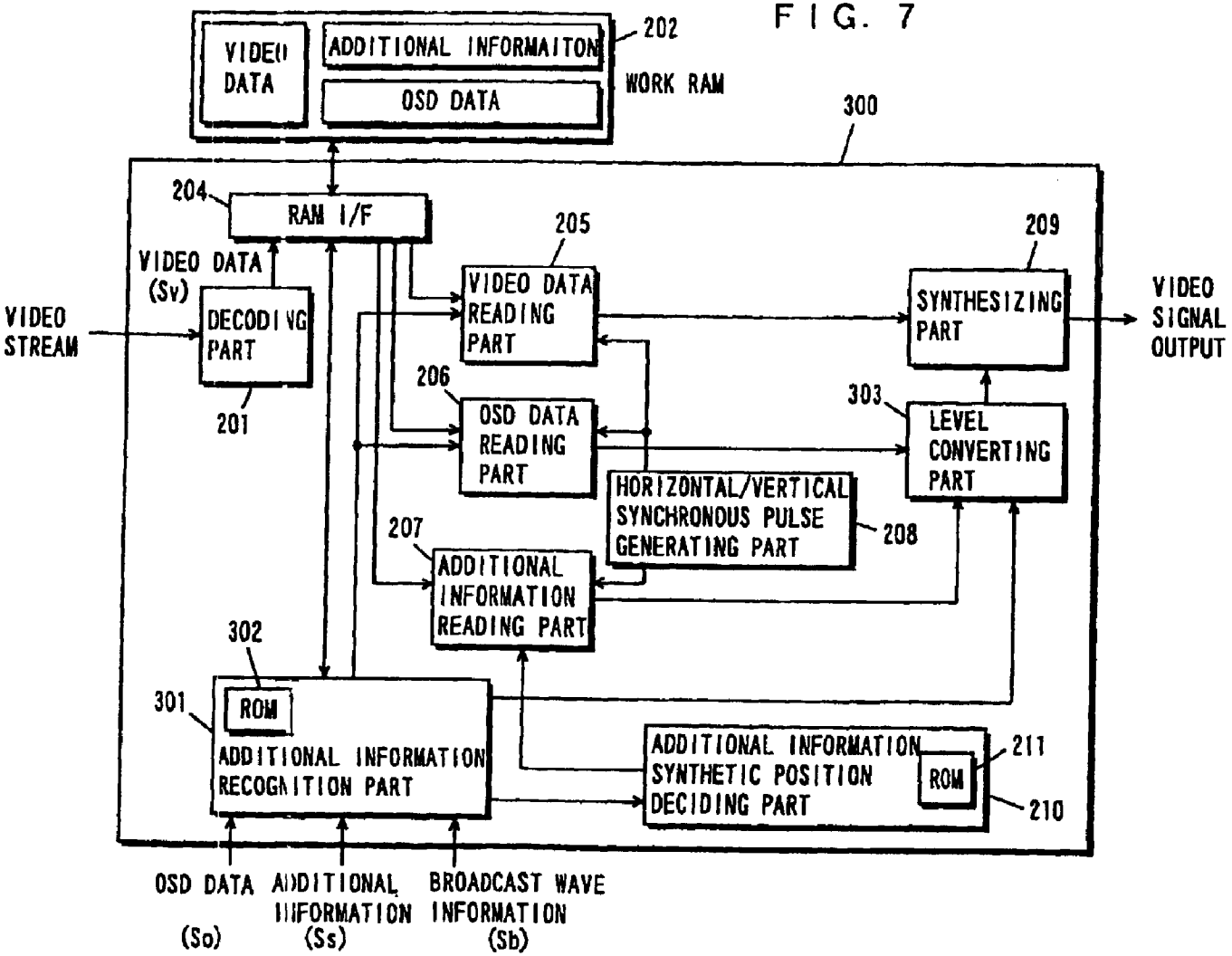
FIG. 7 shows a block diagram which is the structure of a television signal processor according to a second embodiment of the present invention.
Figure 8:
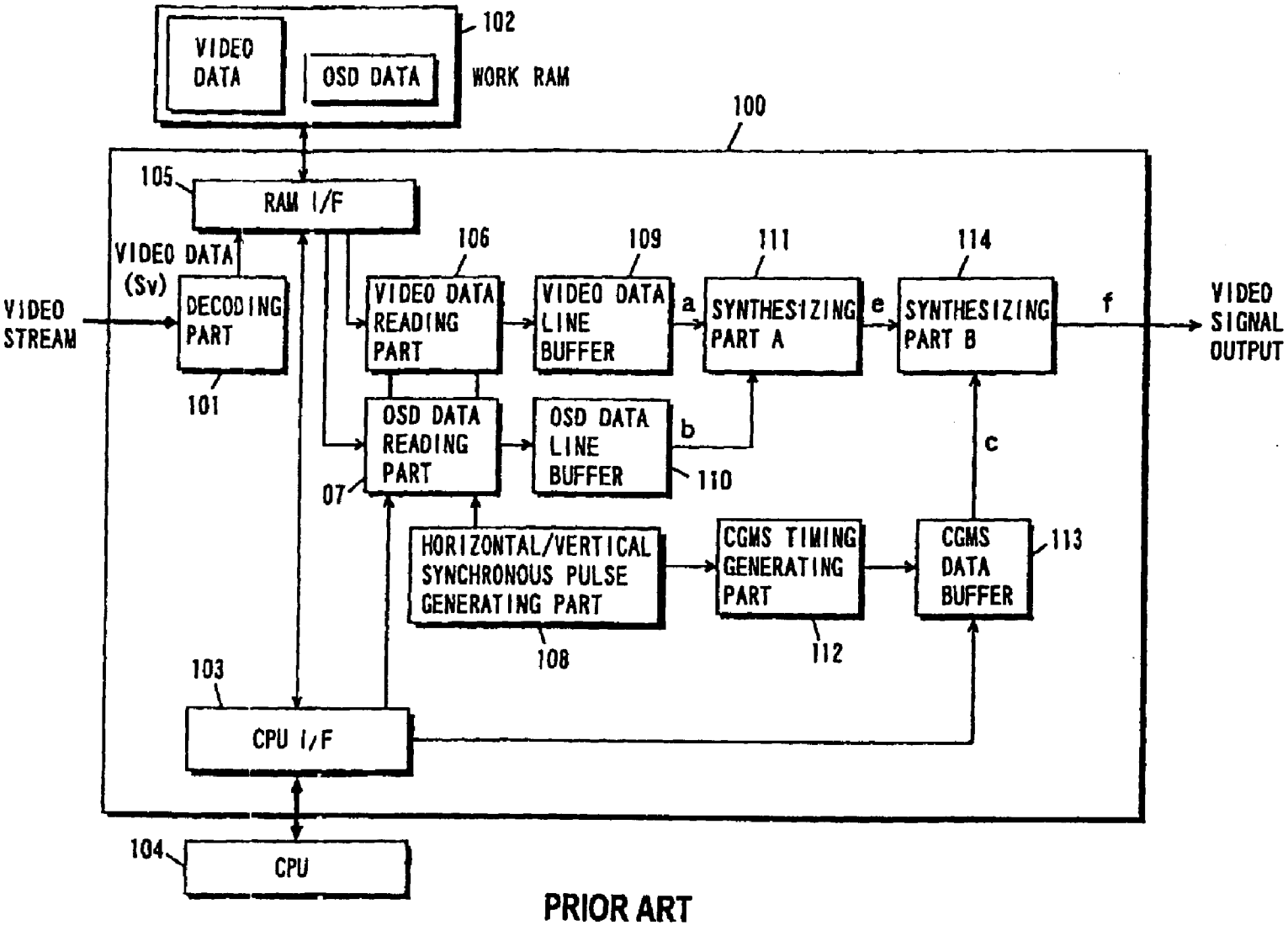
FIG. 8 PRIOR ART
FIG. 8 shows a block diagram which is the structure of a conventional television signal processor.

FIG. 7 shows a block diagram which is the structure of a television signal processor according to a second embodiment of the present invention. The television signal processor 300 shown in FIG. 7 comprises a decoding part 201, an additional information recognizing part 301, a ROM 302 in the additional information recognizing part 301, a RAM interface 204, a video data reading part 205, an OSD data reading part 206, an additional information reading part 207, a horizontal/vertical synchronous pulse generating part 208, a combining part 209 and an additional information synthetic position deciding part 210, a ROM 211 in the additional information synthetic position deciding part 210, and a level converting part 303. As to components similar to those of the first embodiment, reference numerals are rendered identical and description thereof is omitted.

The television signal processor 300 in this embodiment can convert the output level of the additional information Ss varying with a broadcast wave on which the additional information Ss is multiplexed into a standardized output level so as to combine the same. The additional information recognizing part 301 generates color conversion information on the basis of OSD data generated by the CPU 7 in FIG. 1 (hereinafter, referred to as OSD color conversion information). Hereinafter description is made under classification to an effective display area and a retrace interval.

In the effective display area, OSD data So read by the OSD data reading part 206 is first inputted in the level converting part 303. The additional information recognizing part 301 outputs the OSD color conversion information generated by itself to the level converting part 303. On the basis of the inputted OSD color conversion information, the level convertor 303 converts the OSD data So and outputs the same to the combining part 209 in order to display the OSD data So on the screen of a television. The combining part 209 combines the color-converted OSD data So and video data Sv read by the video data reading part 205.

At the retrace interval, on the other hand, the additional recognizing part 301 can recognize the standard of a broadcast wave on the basis of the inputted broadcast wave information Sb. In the ROM 302, in addition to the target values stored in the additional information recognizing part 203 in the first embodiment, information relevant to the output level of additional information Ss previously determined according to a standard of the broadcast wave is stored. When the additional information recognizing part 301 recognizes the standard of the broadcast wave, therefore, the additional information recognizing part 301 refers to the ROM 302 and can select the output level corresponding to the standard of the additional information Ss. This is because the output level of the additional information Ss is determined according to a standard. The additional information recognizing part 301 notifies the level converting part 303 about the selected output level of the additional information Ss.

In the level converting part 303, an output level notice of the additional information Ss selected by the additional information recognizing part 301 and the additional information Ss read by the additional information reading part 207 are inputted. The level converting part 303 receives the output level of the additional information Ss notified by the additional information recognizing part 301, converts the same to the output level of the additional information CGMS or the additional information WSS shown in FIG. 6, for example, and outputs the same to the combining part 209. The combining part 209 combines in the additional information Ss whose output level has been converted in the interval, while combining the OSD data So and the video data Sv at an effective display interval and outputting the same as a video signal.

The present invention can be employed for a television signal processor which can process a received broadcast wave and combine video data, OSD data and additional information regularly in a proper state.

What is claimed is:

1. A television signal processor for processing a received broadcast wave and generating a television signal, said television signal processor comprising:

storage means for storing video data and additional information separated from the received broadcast wave and OSD data generated on a receiver;

read means for respectively reading the video data, the additional information and the OSD data from said storage means;

standard detection means for detecting a standard of the received broadcast wave;

timing control means for respectively controlling timing of said read means for reading the video data, the OSD data and the additional information from said storage means in correspondence to the standard detected by said standard detections means; and combining means for combining the video data, the OSD data and the additional information read by said read means as combined data to output the combined data as the television signal.

[2. The television signal processor according to claim 1, wherein the received broadcast wave is a digital broadcast wave.]

[3. The television signal processor according to claim 1, wherein said timing control means comprises:

memory means for storing timing information for defining the read timing of said read means according to the standard of the received broadcast wave; and reference means for referring to said memory means for the timing information corresponding to the standard detected by said standard detection means, and supplying the timing information to said read means, wherein said read means respectively reads the video data, the additional information, and the OSD data from said storage means at timing corresponding to the timing information supplied from said reference means.]

[4. The television signal processing according to claim 3, wherein said memory means comprises:

a first table memory operable to store timing information for defining read timing for the video data and the OSD data according to the standard of the received broadcast wave; and a second table memory operable to store timing information for defining read timing for the additional information according to the standard of the received broadcast wave and information in the additional information, wherein said reference means refers to said first table memory thereby providing said read means with the timing information for defining the read timing for the video data and the OSD data, and refers to said second table memory thereby providing said read means with the timing information for defining the read timing for the additional information.]

[5. The television signal processing according to claim 1, further comprising level conversion means for converting an output level of the additional information read by said read means, wherein said combining means combines the additional information, whose input level was converted by said level conversion means, with the video data and the OSD data read by said read means.]

[6. The television signal processor according to claim 5, wherein said level conversion means converts the output level of the additional information to a level determined according to the standard detected by said standard detection means.]

*7. A television signal processor comprising:*

*a separator operable to separate a video stream and additional information from a received broadcast wave;*

*a generator operable to generate OSD data;*

*a detector operable to detect a standard of the received broadcast wave;*

*a timing information generator operable to generate each timing information of the video stream, the OSD data and the additional information, the timing information depending on the standard; and*

*a synthesizer operable to synthesize the video stream, the OSD data and the additional information in accordance with the timing information.*

*8. A television signal processing method comprising:*

*separating a video stream and additional information from a received broadcast wave;*

*generating OSD data;*

*detecting a standard of the received broadcast wave;*

*generating each timing information of the video stream, the OSD data and the additional information, the timing information depending on the standard; and*

*synthesizing the video stream, the OSD data and the additional information in accordance with the timing information.*

*9. A receiving apparatus comprising:*

*a receiver operable to receive a broadcast wave;*

*a separator operable to separate a video stream from the broadcast wave;*

*a generator operable to generate OSD data;*

*a detector operable to detect a standard of the broadcast wave;*

*a timing information generator operable to generate each timing information of the video stream and the OSD data, the timing information depending on the standard; and*

*a synthesizer operable to synthesize the video stream and the OSD data in accordance with the timing information.*

*10. A receiving apparatus comprising:*

*a receiver operable to receive a broadcast wave;*

*a separator operable to separate a video stream and additional information which is copy generation control information or copy guard information, from the broadcast wave;*

*a detector operable to detect a standard of the broadcast wave; and*

*a synthesizer operable to synthesize the video stream and the additional information depending on the standard.*

*11. A television signal processor comprising:*

*a separator operable to separate a video stream and additional information from a received broadcast wave; and*

*a synthesizer operable to synthesize the video stream and the additional information, wherein the synthesizer synthesizes the video stream and the additional information in different timings depending on a standard of the received broadcast wave.*

*12. The television signal processor according to claim 11, wherein:*

*the additional information is copy generation control information or copy guard information.*

*13. A television signal processor comprising:*

*a separator operable to separate a video stream and additional information from a received broadcast wave; and*

*a synthesizer operable to synthesize the video stream and the additional information, wherein the synthesizer synthesizes the video stream and the additional information in different timings depending on a video standard of the received broadcast wave.*

*14. The television signal processor according to claim 13, wherein:*

*the additional information is copy generation control information or copy guard information.*

*15. A receiving apparatus comprising:*

*a receiver operable to receive a broadcast wave;*

*a separator operable to receive a video stream from the broadcast wave;*

*a generator operable to generate OSD data; and*

*a synthesizer operable to synthesize the video stream and the OSD data, wherein the synthesizer synthesizes the video stream and the OSD data in different timings depending on a standard of the broadcast wave.*

*16. A receiving apparatus comprising:*

*a receiver operable to receive a broadcast wave;*

*a separator operable to separate a video stream from the broadcast wave;*

*a generator operable to generate OSD data; and*

*a synthesizer operable to synthesize the video stream and the OSD data in different timings depending on a video standard of the broadcast wave.*

*17. A receiving apparatus comprising:*

*a receiver operable to receive a broadcast wave;*

*a separator operable to separate a video stream and additional information, from the broadcast wave; and*

*a synthesizer operable to synthesize the video stream and the additional information, wherein the synthesizer synthesizes the video stream and the additional information in different timings depending on a standard of the broadcast wave.*

*18. The receiving apparatus according to claim 17, wherein:*

*the additional information is copy generation control information or copy guard information.*

*19. A receiving apparatus comprising:*

*a receiver operable to receive a broadcast wave;*

*a separator operable to separate a video stream and additional information, from the broadcast wave; and*

*a synthesizer operable to synthesize the video stream and the additional information, wherein the synthesizer synthesizes the video stream and the additional information in different timings depending on a video standard of the broadcast wave.*

*20. The receiving apparatus according to claim 19, wherein:*

*the additional information is copy generation control information or copy guard information.*

*21. A television signal processor comprising:*

*a separator operable to separate a video stream and additional information which is copy generation control information or copy guard information, from a received broadcast wave; and*

*a level converter operable to convert an output level of the additional information in accordance with a standard of the received broadcast wave.*

*22. A receiving apparatus comprising:*

*a receiver operable to receive a broadcast wave;*

*a separator operable to separate video stream and additional information which is copy generation control information or copy guard information, from the broadcast wave; and*

*a level converter operable to convert an output level of the additional information in accordance with a standard of the broadcast wave.*

* * * * *

UNITED STATES PATENT AND TRADEMARK OFFICE

CERTIFICATE OF CORRECTION

PATENT NO. : RE 38,954 E
APPLICATION NO. : 10/659683
DATED : January 31, 2006
INVENTOR(S) : Mikihiko Yamada et al.

It is certified that error appears in the above-identified patent and that said Letters Patent is hereby corrected as shown below:

On the title page and col. 1, Line 3

Item (54) Title, please correct the title to read as follows.

Television Signal Processor That Is Operable To Generate A Television Signal

From Broadcast Waves With A Plurality Of Different Broadcast Standards

Signed and Sealed this

Twelfth Day of December, 2006

JON W. DUDAS
*Director of the United States Patent and Trademark Office*